(12) United States Patent
Field

(10) Patent No.: US 7,266,690 B2
(45) Date of Patent: ***Sep. 4, 2007

(54) METHODS AND SYSTEMS FOR PROTECTING INFORMATION IN PAGING OPERATING SYSTEMS

(75) Inventor: Scott A. Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 104 days.

This patent is subject to a terminal disclaimer.

(21) Appl. No.: 11/190,375

(22) Filed: Jul. 26, 2005

(65) Prior Publication Data

US 2005/0262341 A1  Nov. 24, 2005

Related U.S. Application Data

(63) Continuation of application No. 09/489,192, filed on Jan. 20, 2000, now abandoned.

(60) Provisional application No. 60/143,438, filed on Jul. 13, 1999.

(51) Int. Cl.
*H04L 9/00* (2006.01)
(52) U.S. Cl. ...................................... 713/165; 713/164
(58) Field of Classification Search ...................... None
See application file for complete search history.

(56) References Cited

U.S. PATENT DOCUMENTS

| | | | |
|---|---|---|---|
| 5,007,082 A | 4/1991 | Cummins | |
| 5,267,313 A | 11/1993 | Hirata | |
| 5,289,540 A | 2/1994 | Jones | |
| 5,386,469 A | 1/1995 | Yearsley et al. | |
| 5,541,988 A | 7/1996 | Draganoff | |
| 5,598,470 A | 1/1997 | Cooper et al. | |
| 5,628,023 A | 5/1997 | Bryant et al. | |
| 5,757,919 A | 5/1998 | Herbert et al. | |
| 5,825,878 A | 10/1998 | Takahashi et al. | |
| 6,003,117 A | 12/1999 | Buer et al. | |
| 6,249,866 B1 | 6/2001 | Brundrett et al. | |
| 6,708,274 B2 * | 3/2004 | Herbert et al. | ............... 713/190 |
| 6,775,778 B1 | 8/2004 | Laczko, Sr. et al. | |
| 6,775,779 B1 * | 8/2004 | England et al. | ............... 726/26 |

OTHER PUBLICATIONS

Microsoft Computer Dictionary, Fifth Edition, pp. 69, 276 and 442.
Corsinsi, P et al., "An Implementation of Storage Management in Capability Environment," 1995, Software-Practice & Experience Journal, V25, N5 (May) Abstract.
Freislaben, B et al., "Capabillities and Encryption: Tho Ultimate Defense Against Security Attacks?". 1990, Spinner-Verlag, Berlin, Germany, Abstract.

* cited by examiner

*Primary Examiner*—Nasser Moazzami
*Assistant Examiner*—Pramila Parhasrathy
(74) *Attorney, Agent, or Firm*—Lee & Hayes, PLLC

(57) ABSTRACT

The inventive methods and systems provide an approach to protecting unencrypted sensitive information from being paged out to secondary storage, such as a hard disk, during paging operations. In the described embodiment, a key is provided and is maintained in the main memory of a virtual memory system. Measures are taken to protect the key such as page-locking the key in the main memory to ensure that it never gets paged out to the secondary storage. The described key is a desirably large key that is randomly generated by the operating system. When sensitive information is to be placed in the main memory, it is encrypted with the page-locked key. The encrypted sensitive information can then be paged out to secondary storage without concern about its security. When the encrypted sensitive information is needed by a process or application, it is retrieved from secondary storage and decrypted using the page-locked key. For further protection, the sensitive information can be decrypted into a page-locked page of main memory. More than one key can be used to encrypt and/or decrypt the sensitive information.

6 Claims, 6 Drawing Sheets

METHODS AND SYSTEMS FOR PROTECTING INFORMATION IN PAGING OPERATING SYSTEMS

PRIORITY APPLICATION

This application stems from and claims priority to U.S. Provisional Patent Application No. 60/143,438, filed on Jul. 13, 1999, the disclosure of which is hereby incorporated by reference. This application is also a continuation of and claims priority to U.S. patent application Ser. No. 09/489,192, filed on Jan. 20, 2000 now abandoned the disclosure of which is incorporated by reference herein.

TECHNICAL FIELD

This invention relates to paging operating systems and, more particularly, to methods and systems of protecting information within paging operating systems.

BACKGROUND

Computer systems, in general, include a main memory (also known as the computer's "physical memory") for storing data and instructions of currently executing programs ("process threads"). Typically, the main memory is organized as a plurality of sequentially numbered storage units, each containing a fixed size quantity (e.g. an 8-bit byte in byte oriented computers). The numbering of the storage units (typically in binary or hexadecimal values starting from zero up to the total number of storage units minus one) serve as addresses by which a particular storage unit can be referenced for reading or writing the data contained therein. The set of numbers by which the storage units are addressed is known as the "physical address space" of the main memory. Main memory typically is realized using semiconductor memory which provides fast, random-access to the various storage units, but requires constant application of electrical energy for operation (i.e. the memory is volatile).

Computer systems also typically provide one or more secondary storage or memory devices which are generally slower than the main memory, but have a much greater storage capacity than the main memory. The secondary storage devices typically store data on a magnetic or optical media that is non-volatile, such as a hard disk. Secondary storage devices generally store data in the form of files or sequential data streams.

Due to the greater speed at which data can be accessed in main memory, data that is currently in use by process threads running on the computer system is desirably stored in the main memory. Due to the smaller storage capacity of the main memory, however, main memory may be unable to store all the information needed by process threads. Accordingly, data that is no longer currently in use is desirably removed from the main memory, or moved from the main memory to the secondary storage devices.

Techniques to efficiently manage the use of the main memory ("memory management techniques") by process threads are conventionally known. One standard technique, commonly known as "virtual memory," is implemented by many operating systems, usually in cooperation with a computer system's processor. Virtual memory techniques create a separate address space, referred to as the "virtual address space" or "process address space" by which process threads access data in memory. The operating system and processor translates or maps a subset of the virtual addresses in the virtual address space to actual physical addresses in the main memory's physical address space. When a process thread reads or writes data to a virtual address in its virtual address space, the operating system and/or processor translates the virtual address to a corresponding physical address of a storage unit in the main memory where the data is to be read or written. In Microsoft Corporation's Windows NT operating system, for example, a component called the virtual memory manager implements a separate virtual address space for each process in cooperation with the computer's processor.

Since the virtual address space is typically much larger than the physical address space of the main memory, only a subset of the virtual address space can be resident in main memory at one time. Data not resident in main memory is temporarily stored in a "backing store" or "paging" file on the computer's hard disk. When the main memory becomes over committed (i.e. its storage capacity is exceeded), the operating system begins swapping some of the contents of the main memory to the "backing store" file. When the data is again required by a process thread, the operating system transfers the data back into the main memory from the backing store file. By swapping data that is no longer needed to the hard disk, virtual memory allows programmers to create and run programs that require more storage capacity than is available in the main memory alone.

Moving data between the main memory and the hard disk is most efficiently performed in larger size blocks (as compared to bytes or words). Accordingly, virtual memory techniques generally perform swapping in large size blocks. Microsoft Corporation's Windows NT operating system, for example, divides the virtual address space of each process thread into equal size blocks referred to as "pages." The main memory also is divided into similar size blocks called "page frames," which contain the pages mapped into the main memory. The page size in the Windows NT operating system can vary depending on the requirements of the particular computer on which it is run.

In the Windows NT operating system, each process has a set of pages from its virtual address space that are present in physical memory at any given time. Pages that are currently in the main memory and immediately available are termed "valid pages." Pages that are stored on disk (or in memory but not immediately available) are called "invalid pages." When an executing thread accesses a virtual address in a page marked "invalid", the processor issues a system trap called a "page fault." The operating system then locates the required page on the hard disk and loads it into a free page frame in the main memory. When the number of available page frames runs low, the virtual memory system selects page frames to free and copies their contents to the hard disk. This activity, known as "paging," is imperceptible to the programmer.

One of the problems that continues to confront so-called paging operating systems, such as the one described above, concerns the treatment of sensitive information (e.g. passwords to access network resources, credit card information used during an Internet shopping session, and the like). For example, when an individual, using a password, logs onto an operating system such as Windows NT, the individual's password can typically be kept in memory for various reasons. For example, if the user locks a work station and wants to later unlock it, the operating system needs to validate against something. Thus, the operating system goes out to main memory and compares what is typed in by a user with what is sitting in the memory. Between these two points in time, however, the password may have entered the paging file because the operating system may have decided that the logon process was idle. Having the password in the paging file can leave it open to attack, e.g. if the machine on which the paging file is located were to be physically stolen. Thus, because of the nature of paging operating systems, sensitive information can sometimes be undesirably placed in a paging file in secondary memory. In security-sensitive installations, preventing the sensitive information from reaching the paging file may be advantageous.

There have been attempts in the past to address the situation of sensitive information making it into the paging file. These attempts have been successful in some respects, but still fall short of the mark insofar as providing a system that is desirably secure and economical to use.

One past approach has been to designate certain pages of the main memory as "page locked," and to place sensitive information only in page-locked pages. The "page locked" designation is a flag that tells the memory manager that the designated page is never to be moved to the paging file. While this ensures that the sensitive information does not make its way to the paging file, it consumes valuable main memory. Because there is a finite amount of main memory available, this approach is not optimal.

Another approach has been to configure the operating system to zero portions of the page file which are no longer associated with allocated memory when the operating system is shut down. This approach is problematic in the event that any of the following two events occurs: (1) power loss—induced or accidental, and (2) pages of memory are still allocated and active that contain sensitive information. In the former case, once power loss has occurred, an attacker can analyze the page file and "undo" any obfuscation as necessary. The operating system never had a change to zero the page file which would normally occur during clean shutdown of the operating system. In the latter case, if the pages of memory are still allocated and active, the operating system will be unable to zero the sensitive information that is contained in such pages.

Yet another approach has been to encrypt the sensitive information with a key that is hard-coded somewhere in the operating system. When the sensitive information is then sent to the hard disk, it will be encrypted and theoretically safe. This approach is not optimal because it is still subject to attack. Specifically, an attacker who accesses the hard disk need only look for data that appears to have been obfuscated with a key and then set about to break the key. Obfuscated or encrypted information can be recognized using a variety of approaches, for example, measuring the entropy of blocks of data. Once the key is broken, all of the encrypted information can be accessed. And, because the key is hard-coded, it never changes. Thus, once it is discovered by an attacker, the attacker can have access to all information that has been or will be encrypted using the hard-coded key.

This invention arose out of concerns associated with providing improved methods and systems for protecting information that is used in paging operating systems.

SUMMARY

The inventive methods and systems provide an approach to protecting unencrypted sensitive information from being paged out to secondary memory, such as a hard disk, during paging operations. In the described embodiment, a key is provided and is maintained in the main memory of a virtual memory system. Measures are taken to protect the key such as page-locking the key in the main memory to ensure that it never gets paged out to the secondary memory. The illustrated key is a desirably large key that is randomly generated by the operating system. When sensitive information is to be placed in the main memory, it is encrypted with the page-locked key. The encrypted sensitive information can then be paged out to secondary memory without concern about its security. When the encrypted sensitive information is needed by a process or application, it is retrieved from secondary memory and decrypted using the page-locked key. For further protection, the sensitive information can be decrypted into a page-locked page of main memory. More than one key can be used to encrypt and/or decrypt the sensitive information.

In one aspect, the encryption/decryption process can be initiated by one or more applications. The applications initiate the encryption process by calling a software component that handles the encryption/decryption. In the described embodiment, the software component comprises the operating system kernel. The software component retrieves the page-locked key and performs the encryption on the sensitive information.

In another aspect, the memory manager is closely integrated with the encryption/decryption process. Specifically, each page in main memory has an attribute that can indicate that it is a secure page. When the memory manager handles secure pages, it is programmed to ensure that the page is encrypted before paging it out to the paging file. All encryption/decryption thus takes place through the memory manager.

DETAILED DESCRIPTION

Exemplary Computer System

Figure 1:
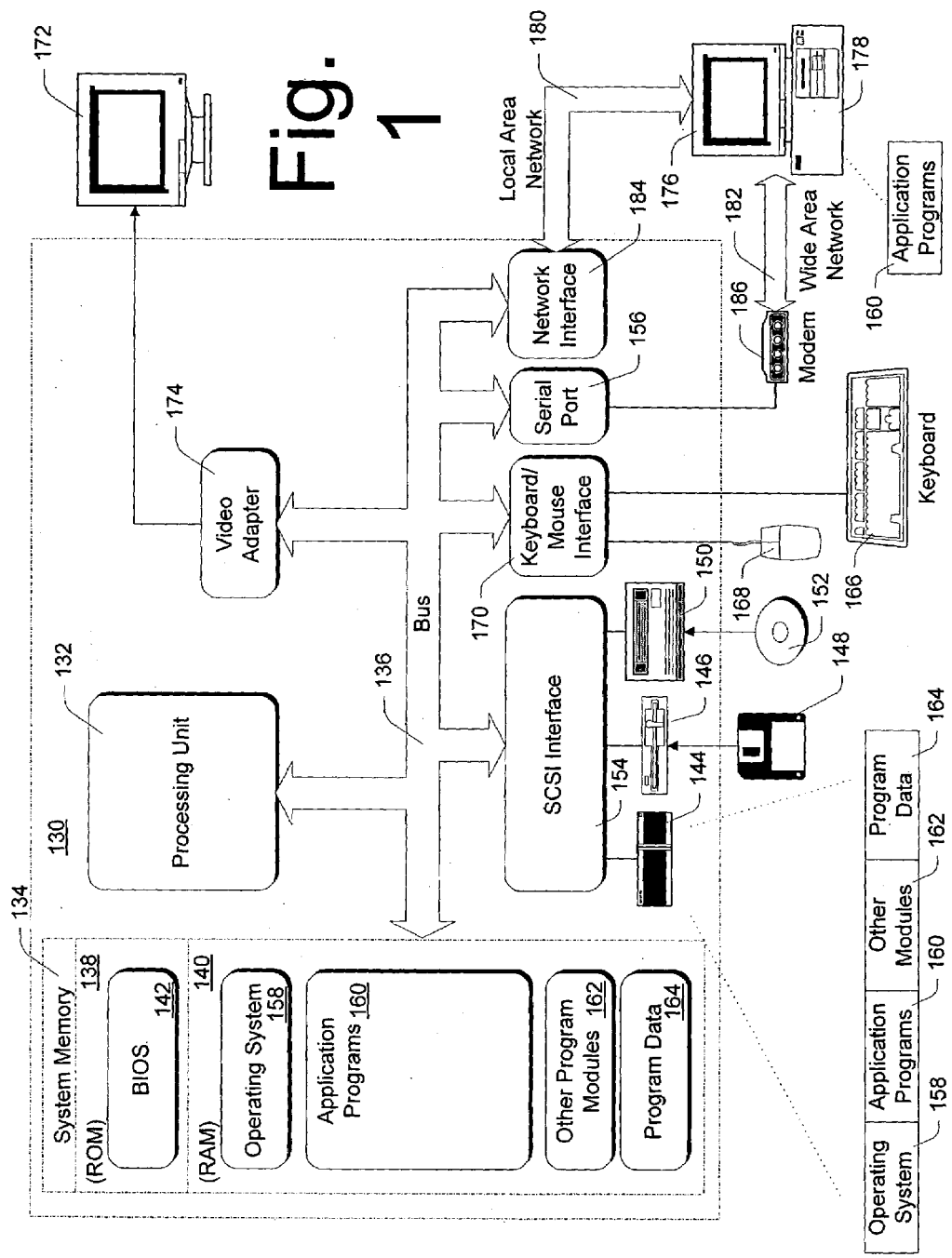
FIG. 1 is an exemplary computer system that can be used to implement the described embodiments.

FIG. 1 shows a general example of a desktop computer 130 that can be used in accordance with the invention. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Operating System

The described embodiment is illustrated in the context of Microsoft Corporation's Windows NT operating system. For a complete discussion of the Windows NT operating system see "Inside Windows NT", by Helen Custer, Microsoft Press, 1993. A brief overview of part of the general operation of the Windows NT operating system and associated terminology is provided below before discussing the details of the described embodiment.

Figure 2:
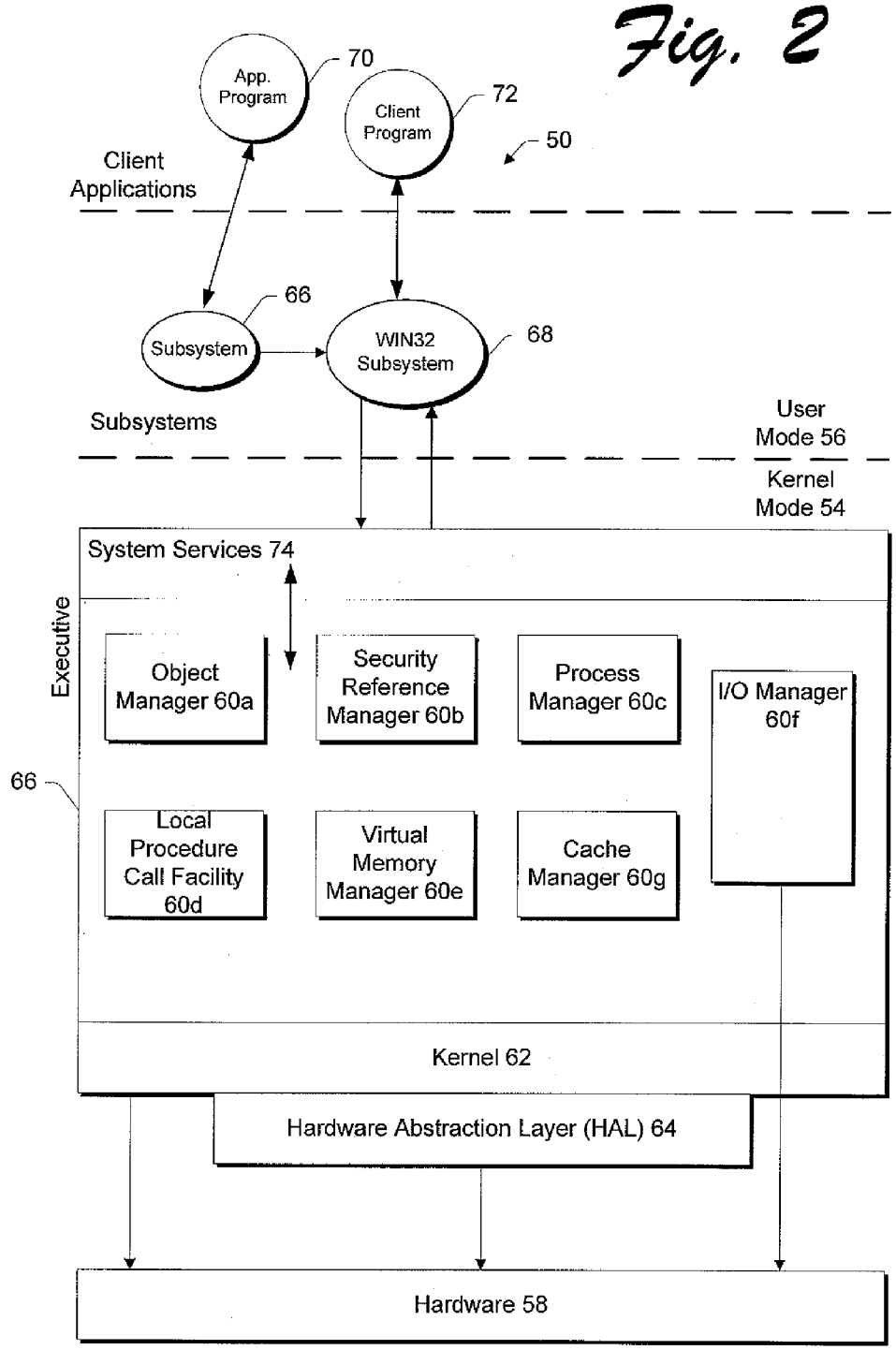
FIG. 2 is a block diagram of an operating system architecture within a computer system such as the one shown in FIG. 1.

FIG. 2 shows the Windows NT operating system 50 divided into two parts: the "kernel mode" 54 and the "user mode" 56.

The kernel mode 54 is a privileged processor mode in which the operating system code runs with access to system data and to the hardware. Depicted as part of the kernel mode 54 is the physical computer hardware 58 itself (e.g. part or all of the computer system of FIG. 1), since it is only through the kernel mode that these resources can be accessed.

The portion of the operating system depicted as part of the kernel mode 54 is called the "executive" 60. The executive comprises modules that implement object (resource) management 60*a*, portions of the security system 60*b*, process manager 60*c*, interprocess communication 60*d*, virtual memory management 60*e*, I/O manager 60*f*, and the cache manager 60*g*.

The bottommost portions of the executive are called the "kernel" 62 and the "hardware abstraction layer" ("HAL") 64. The kernel 62 performs low-level operating system functions, such as thread scheduling, interrupt and exception dispatching, and multiprocessor synchronization. The hardware abstraction layer (HAL) 64 is a layer of code that isolates the kernel and the rest of the executive from platform-specific hardware differences. The HAL thus hides hardware-dependent details such as I/O interfaces, interrupt controllers, and multiprocessor communication mechanisms. Rather than access hardware directly, the components of the executive maintain portability by calling the HAL routine when platform-specific information is needed.

The user mode 56 is a nonprivileged processor mode in which subsystems/servers (e.g. subsystem 66 and Win32 subsystem 68) and application programs 70 and client programs 72 (hereafter "applications" and "clients," respectively) run, with a limited set of interfaces available and with limited access to system data.

Each subsystem implements a single set of services, for example, memory services, process creation services, or processor scheduling services. The illustrated Win32 subsystem 68, for example, makes a 32-bit application programming interface (API) available to application programs. Each subsystem runs in user mode, executing a processing loop that checks whether a client 72 has requested one of its services. The client 72 may be another operating system component or an application program.

The executive 60 is a series of components, each of which implements two sets of functions: system services 74, which can be called from client programs as well as other executive components, and internal routines, which are available only to components within the executive. System services include (a) the object manager 60a, which is responsible for creating, managing and deleting objects (objects are abstract data structures used to represent operating system resources); (b) the process manager 60c, which is responsible for creating/terminating processes and threads, and for suspending/resuming execution of threads; and (c) the I/o manager 60f, which is responsible for implementing device-independent I/O facilities as well as device-dependent I/O facilities.

The client 72 requests a service by sending a message to a subsystem 68, as represented by the solid arrow between the depicted Win32 client 72 and the Win32 subsystem 68. The message passes through system services 74 and the executive 60, which delivers the message to the subsystem. After the subsystem 68 performs the operation, the results are passed to the client 72 in another message, as represented by the arrow between the Win32 subsystem and the Win32 client 72.

In Windows NT, shareable resources, such as files, memory, processes and threads, are implemented as "objects" and are accessed by using "object services." As is well known in the art, an "object" is a data structure whose physical format is hidden behind a type definition. Data structures, also referred to as records or formats, are organization schemes applied to data so that it can be interpreted and so that specific operations can be performed on that data. Such data structures impose a physical organization on the collection of data stored within computer memory and represent specific electrical or magnetic elements.

An "object type," also called an "object class," comprises a data-type, services that operate on instances of the data type, and a set of object attributes. An "object attribute" is a field of data in an object that partially defines that object's state. An "object service" implements and manipulates objects, usually by reading or changing the object attributes. The object manager 60a is responsible for creating, deleting, protecting, and tracking user application visible objects.

The Windows NT operating system allows users to execute more than one program at a time by organizing the many tasks that it must perform into "processes". The operating system allocates a portion of the computer's resources to each process and ensures that each process's program is dispatched for execution at the appropriate time and in the appropriate order. This function is implemented by the process manager 60c.

Processes can be implemented as objects. A process object comprises the following elements: an executable program; a private address space; system resources (e.g., communication ports and files) that the operating system allocates to the process as the program executes; and at least one "thread of execution."

A "thread" is the entity within a process that the kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes. Periodically, a thread may stop executing while, for example, a slow I/O device completes a data transfer or while another thread is using a resource it needs. Because it would be inefficient to have the processor remain idle while the thread is waiting, a multi-tasking operating system will switch the processor's execution from one thread to another in order to take advantage of processor cycles that otherwise would be wasted. This procedure is referred to as "context switching." When the I/O device completes its data transfer or when a resource needed by the thread becomes available, the operating system will eventually perform another context switch back to the original thread. Because of the speed of the processor, both of the threads appear to the user to execute at the same time. Threads that execute programs in the user mode, such as the server 66, the subsystem 68, the application program 70, and the client program 72, are referred to as user mode threads. Threads that execute only operating system components in kernel mode are referred to as kernel mode threads.

The Encryption/Decryption Key(s)

In the described embodiment, use is made of an encryption/decryption key(s). The illustrated and described key is a randomly-generated key that is used to encrypt information that might be paged out to the paging file. The key is maintained in main memory and is page-locked so that it cannot be paged out to the secondary memory. Any generation techniques or generators can be used to generate the random key. An exemplary technique comprises RSA RC4 which is used for encryption and decryption using a random 2048 bit (256 byte) cryptographic key. In the described embodiment, this key is used to both encrypt and decrypt the pageable information. It is to be understood, however, that one key might be used to encrypt the information while another key might be used to decrypt the information. In addition, different keys might be used for different purposes. For example, each separate process might have its own unique key that is associated with the process. In addition, identifying information might be encrypted along with the encrypted information to uniquely identify the process that is associated with the particular encrypted information. Then, only the process that is associated with the particular encrypted information can decrypt it.

In the described embodiment, the information-protection process takes place in three separate but related phases—an initialization phase, a protection phase, and an access phase.

Initialization Phase

Figure 3:
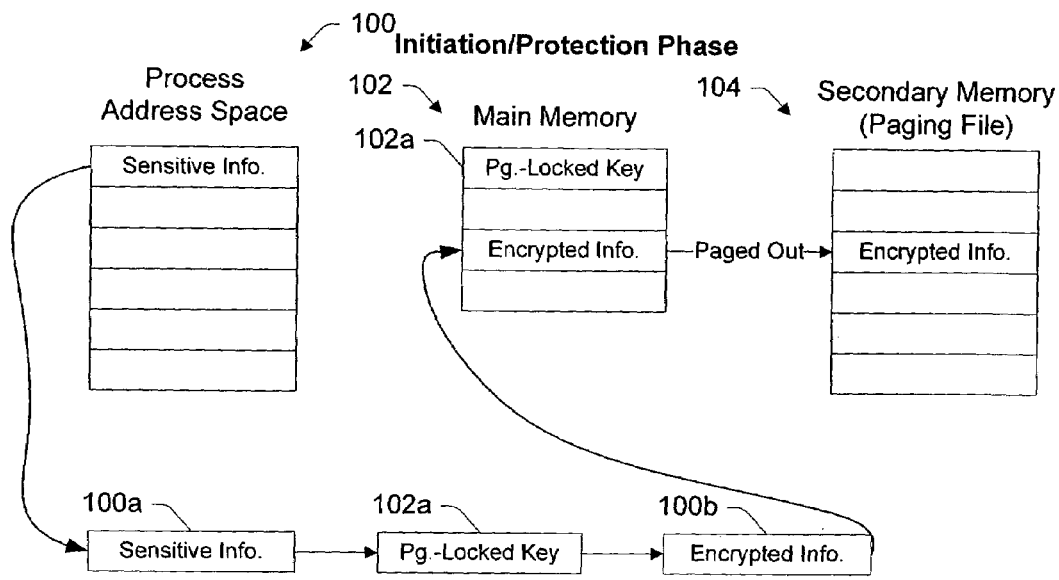
FIG. 3 is a diagrammatic representation of an exemplary initiation/protection phase in accordance with a described embodiment.
Figure 4:
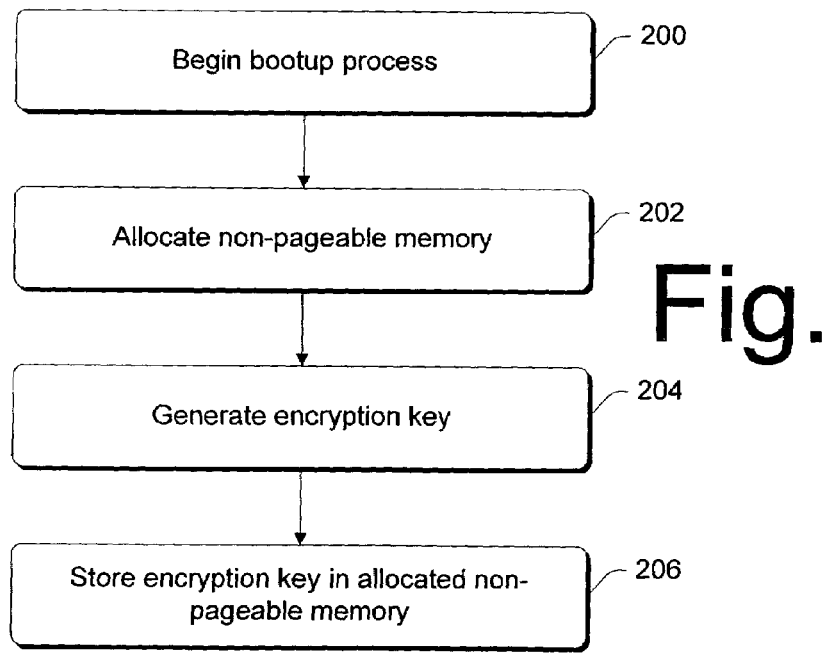
FIG. 4 is a flow diagram that describes steps in a method in accordance with a described embodiment.

The initialization phase is described with reference to FIGS. 3 and 4. FIG. 3 shows an exemplary process address space 100, main memory 102, and second memory (paging file) 104. FIG. 4 shows a flow diagram that describes steps in an initialization method in accordance with the described embodiment. It is to be understood that the described initialization phase constitutes but one way of initializing the protection process and is not intended to limit the scope of protection afforded by this patent.

Step 200 (FIG. 4) begins the boot up process for the computer system. During boot up, the operating system kernel 62 (FIG. 2) allocates a single page of non-pageable memory (step 202). In the described embodiment, access to the allocated page is restricted to the software component that does the encryption/decryption—here, the kernel 62. Thus, user-mode applications cannot access this memory page. Step 204 generates an encryption key. An exemplary encryption key was mentioned above. After the encryption key has been generated, step 206 stores the encryption key in a non-pageable page (i.e. page-locked) of main memory 102. FIG. 3 shows an exemplary page-locked key at 102*a*.

The implication of having the key stored in a page-locked page in main memory is that the key can never be paged out to the paging file. This aspect, combined with the nature of the key (i.e. a very large random key) provides a degree of protection that previously was not afforded. For example, if the key cannot be paged out to the paging file, then it is not susceptible to capture. Additionally, because access to the key is restricted to only the kernel 62, it is further insulated from attack. Moreover, even if the memory protected by the key were to be paged out to the paging file, the sheer size of the key alone would make breaking the protected memory mathematically infeasible in a reasonable amount of time. And, because the key is randomly generated each time the computer is booted up, there is a different key for each new computer session. In addition, in the event of a power loss, the key will be lost from volatile main memory so that any information that is encrypted and present in the secondary memory will effectively be lost as well. All of these factors combine to provide a level of protection that greatly improves on those methods used in the past.

Protection Phase

Once the encryption key has been created and stored as described above, information can now be protected. FIG. 3 shows an example of how this can take place. There, a quantity of information 100*a* is designated as "sensitive information". Such sensitive information is encrypted with the page-locked key 102*a* to provide encrypted information 100*b*. The encrypted information 100*b* is then placed into main memory 102 in a pageable page. Thus, if and when the pageable page that holds the encrypted information 100*b* is paged out, it is protected in the paging file 104.

The information-protection process can be initiated at the application level or at the memory manager level.

Application-level Initiation

Figure 5:
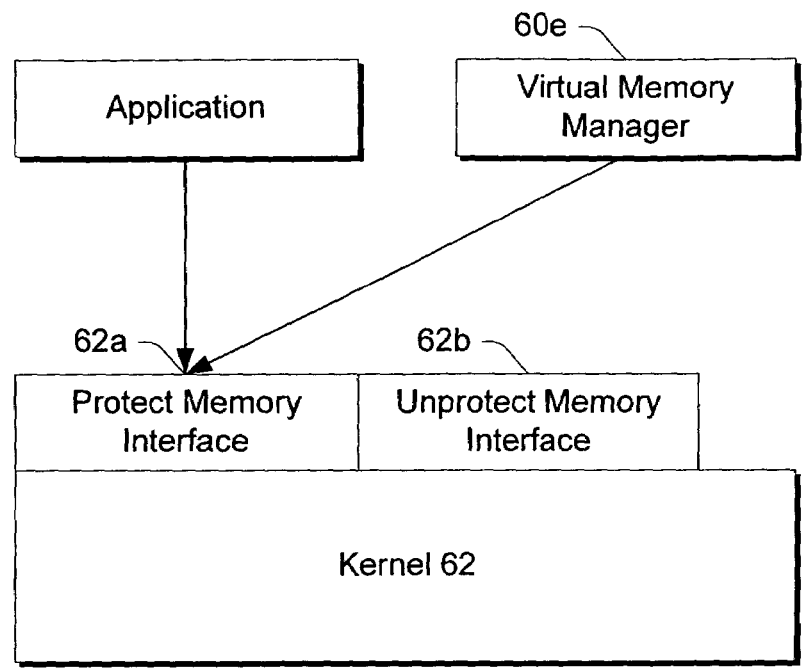
FIG. 5 is a block diagram of internal functions of the operating system kernel and virtual memory manager for protecting and unprotecting information.

FIG. 5 shows one way that the information protection process can be initiated at the application level. There, the kernel 62 provides interfaces that are callable by the application to protect and unprotect portions of the main memory. Specifically, the kernel 62 provides a protect memory interface 62*a* and an unprotect memory interface 62*b*.

Figure 6:
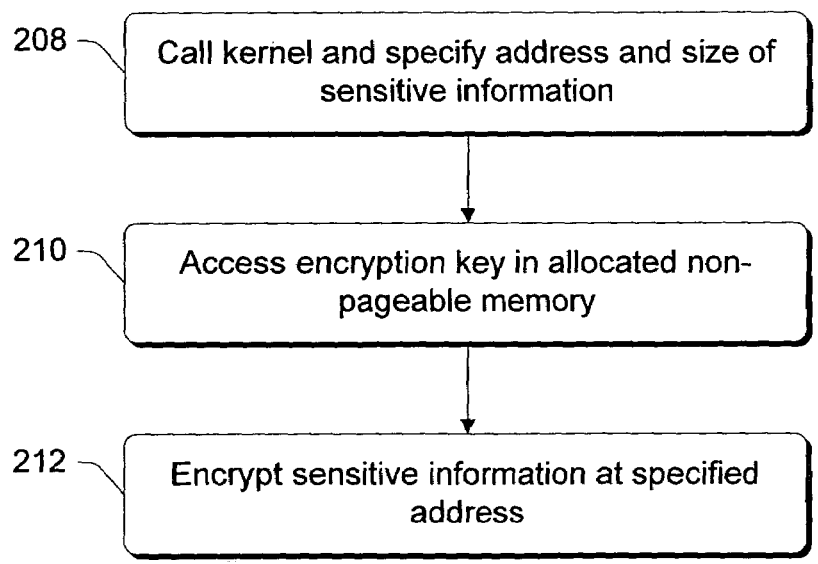
FIG. 6 is a flow diagram that describes steps in a method in accordance with a described embodiment.

FIG. 6 shows a flow diagram that described steps in a method for protecting information using the architecture illustrated in FIG. 5. When an application has information that it wants to protect, it calls the protect memory interface 62*a* of kernel 62 (step 208) and specifies the address and the size of the information that is to be protected. This call causes the kernel 62 to access the encryption key (step 210) in the page-locked page of main memory 102 (FIG. 3). Once the kernel accesses the encryption key, it encrypts the information at the specified address (step 212). The kernel 62 then returns control to the application.

Memory Manager-level Initiation

When the information protection process is initiated at the memory manager 60*e* level, the memory manager, as FIG. 5 implies, makes the calls to the protect memory interface 62*a* of kernel 62. This approach achieves tighter integration with the memory manager. This method alleviates the need for application intervention when dealing with sensitive data.

Figure 7:
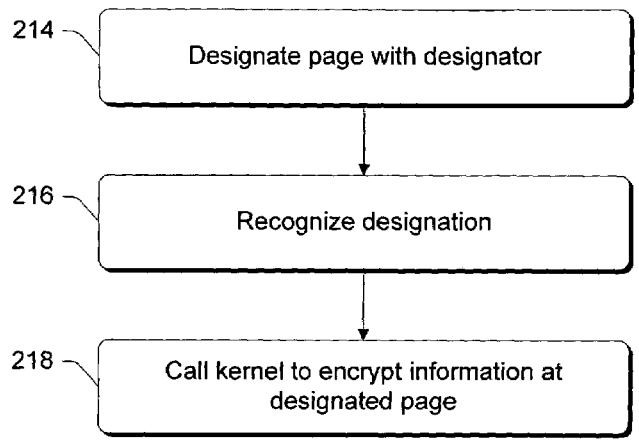
FIG. 7 is a flow diagram that describes steps in a method in accordance with a described embodiment.

FIG. 7 shows a flow diagram that describes steps in a protection process that is initiated at the memory manager level. In the described embodiment, each page in the main memory 102 (FIG. 3) that contains information that is to be protected is designated with a designator (step 214) that can be recognized by the memory manager. In the described embodiment, the designation is an attribute that can be set on the page when it is allocated. For example, an attribute "page_secure" can be associated with each page and, when set, tells the memory manager 60*e* that it must first be encrypted before being paged out. Any time the memory manager 60*e* handles a page with this designation (i.e. when it is in the process of paging the page out to the paging file), it recognizes the designation (step 216) and, responsive thereto, calls the kernel's protect memory interface 62*a* (step 218). This call causes the kernel to encrypt the information as described above.

Access Phase

Figure 8:
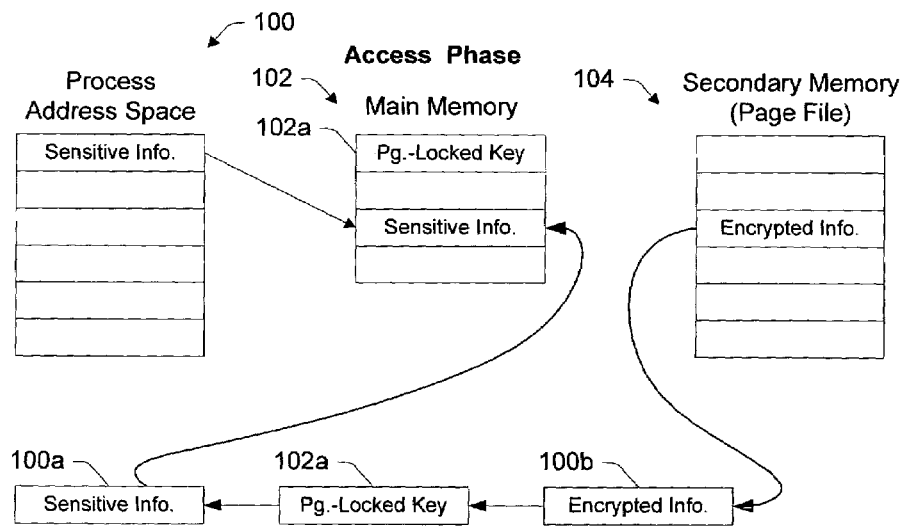
FIG. 8 is a diagrammatic representation of an exemplary access phase in accordance with a described embodiment.
Figure 9:
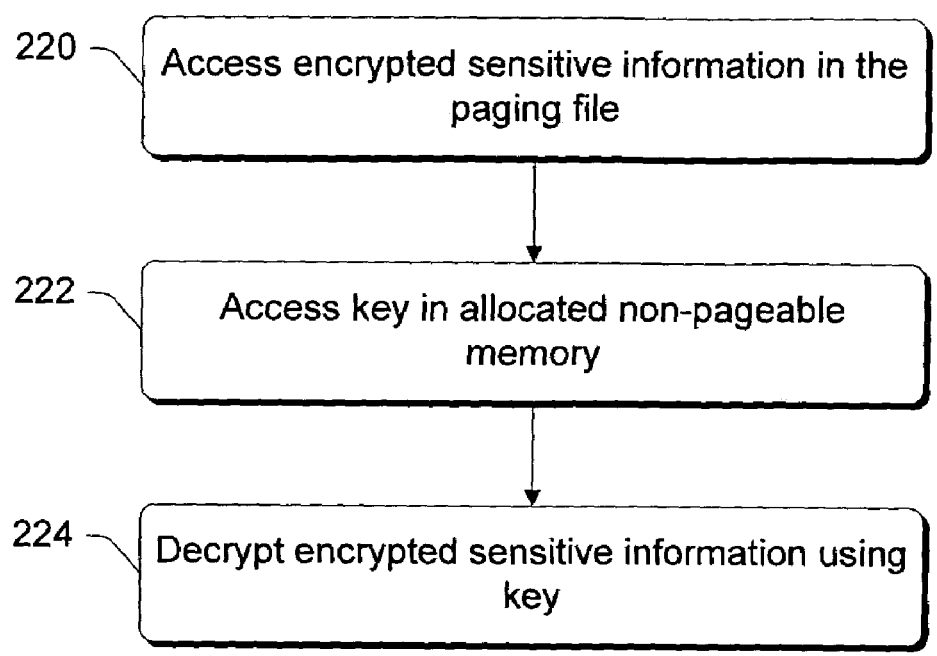
FIG. 9 is a flow diagram that describes steps in a method in accordance with a described embodiment.

The access phase for accessing a page that has been encrypted and paged out to the paging file is described with reference to FIGS. 8 and 9. When a process requires use of information that has been encrypted and paged out to the paging file, step 220 (FIG. 9) accesses the encrypted information 100*b*. Step 222 accesses the page-locked key 102*a* and uses it to decrypt (step 224) the encrypted information. The decrypted information is then placed in main memory 102 where it can be used by the process.

In the described embodiment, decryption can be initiated at the application level or at the memory manager level. At the application level, the application can call the unprotect memory interface 62*b* (FIG. 5) of kernel 62. This call causes the kernel to retrieve the information from the paging file, decrypt it using the page-locked key, and then turn the information over to the application or process. At the memory manager level, when the memory manager retrieves an encrypted page from the paging file, it recognizes the designation (i.e. attribute) on the page and calls the unprotect memory interface 62*b* of the kernel 62. This call causes the kernel to decrypt the information as mentioned above.

When the information is decrypted and placed into main memory, the page into which it is placed should be zeroed as soon as possible to avoid page file exposure. As an added measure of safety, the decrypted information can be placed into a page-locked page to ensure that it does not inadvertently get paged out to the paging file; when the application is finished with the data, it would zero the memory, and then unlock the memory page, assuming it were locked.

CONCLUSION

The inventive methods and systems provide degrees of protection for information that might be paged out to a paging file which were heretofore unavailable. The size, nature and handling of the key(s) that is (are) used for encryption greatly increases the protection of pageable information.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
    a paging operating system having main memory for holding information and secondary storage comprising a page file for receiving information that is paged out from the main memory;
    means for creating a key during system boot up, wherein different keys can be created during different system boot ups, and wherein the means for creating the key comprises generating a random key at each system boot up with a random key generator;
means for page-locking the key in main memory;
means for restricting access to the page-locked key to only the operating system kernel;
means for calling the operating system kernel to encrypt information, wherein the calling comprises specifying a memory location and a memory size associated with the information to be encrypted;
means for accessing the page-locked key with the operating system kernel; and
means for using the operating system kernel to encrypt the information with the page-locked key;
means for designating at least one page in the main memory with a designation; and
means for recognizing the designation and, responsive thereto, means for calling the operating system kernel to encrypt the information.

2. The system of claim 1, wherein said means for recognizing comprises a memory manager.

3. One or more computer-readable media having computer-readable instructions thereon which, when executed in a paging operating system having main memory for holding information and secondary storage comprising a page file for receiving information that is paged out from the main memory, cause the paging operating system to execute a method of protecting information comprising:
creating a key during system boot up, wherein different keys can be created during different system boot ups, and wherein creating the key comprises generating a random key at each system boot up with a random key generator;
page-locking the key in main memory;
restricting access to the page-locked key to only the operating system kernel;
calling the operating system kernel to encrypt information, wherein the calling comprises specifying a memory location and a memory size associated with the information to be encrypted;
accessing the page-locked key with the operating system kernel; and
using the operating system kernel to encrypt the information with the page-locked key; and further comprising prior to said calling:
designating at least one page in the main memory with a designation;
recognizing the designation and, responsive thereto, calling the operating system kernel to encrypt the information.

4. The one or more computer-readable media of claim 3, wherein instructions cause said recognizing to be performed by a memory manager.

5. A system comprising:
one or more processors;
one or more computer-readable media having computer-readable instructions thereon which, when executed by said one or more processors in a paging operating system having main memory for holding information and secondary storage comprising a page file for receiving information that is paged out from the main memory, cause the one or more processors to execute a method of protecting information comprising:
creating a key during system boot up, wherein different keys can be created during different system boot ups, and wherein creating the key comprises generating a random key at each system boot up with a random key generator;
page-locking the key in main memory;
restricting access to the page-locked key to only the operating system kernel;
calling the operating system kernel to encrypt information, wherein the calling comprises specifying a memory location and a memory size associated with the information to be encrypted;
accessing the page-locked key with the operating system kernel; and
using the operating system kernel to encrypt the information with the page-locked key; and further comprising prior to said calling:
designating at least one page in the main memory with a designation;
recognizing the designation and, responsive thereto, calling the operating system kernel to encrypt the information.

6. The system of claim 5, wherein instructions cause said recognizing to be performed by a memory manager.

* * * * *